(12) United States Patent
Noldus

(10) Patent No.: US 7,869,819 B2
(45) Date of Patent: Jan. 11, 2011

(54) INTELLIGENT NETWORK SERVICES IN A MOBILE NETWORK

(75) Inventor: Rogier August Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 801 days.

(21) Appl. No.: 11/722,864

(22) PCT Filed: Dec. 31, 2004

(86) PCT No.: PCT/EP2004/014887

§ 371 (c)(1),
(2), (4) Date: Jun. 26, 2007

(87) PCT Pub. No.: WO2006/069593

PCT Pub. Date: Jul. 6, 2006

(65) Prior Publication Data

US 2008/0146221 A1 Jun. 19, 2008

(51) Int. Cl.
*H04W 4/00* (2009.01)

(52) U.S. Cl. .................. 455/461; 455/433; 455/561

(58) Field of Classification Search ............. 455/403, 455/414.1–2, 433, 435.1–2, 436–439, 461, 455/560, 561; 370/331–333
See application file for complete search history.

(56) References Cited

U.S. PATENT DOCUMENTS

| 6,122,510 | A | 9/2000 | Granberg et al. | |
| 6,643,511 | B1 * | 11/2003 | Rune et al. | 455/433 |
| 7,099,675 | B2 * | 8/2006 | Keutmann et al. | 455/456.1 |
| 7,447,502 | B2 * | 11/2008 | Buckley et al. | 455/434 |
| 2009/0156215 | A1 * | 6/2009 | Pitkamaki | 455/437 |
| 2009/0196265 | A1 * | 8/2009 | Mariblanca Nieves et al. | 370/338 |

FOREIGN PATENT DOCUMENTS

EP 0 660 572 A 6/1995

* cited by examiner

Primary Examiner—Cong Van Tran

(57) ABSTRACT

A method and a system in a mobile communication system including plural mobile communications ranges, each range providing basic mobile telephony services to mobile communications units operating within the mobile communications range, wherein per subscriber, ranges per service node, such as MSC, SGSN and GSMC, are defined, whereby within each range, the corresponding network-specific services are defined.

36 Claims, 2 Drawing Sheets

INTELLIGENT NETWORK SERVICES IN A MOBILE NETWORK

TECHNICAL FIELD OF THE INVENTION

The present invention relates to intelligent network services in a mobile network.

DESCRIPTION OF RELATED ART

In mobile radio communication networks, such as cellular telephone systems, neighbouring radio cells provide coverage of a geographical area to be serviced. Each cell has a Base Station (BS) operated on a set of radio channels. Over such radio channels communications are provided to and from mobile subscribers. A Mobile Switching services Centre (MSC) controls calls between a group of base stations and the public switched telephone network (PSTN), Integrated Services Digital Network (ISDN), and one or more Public Land Mobile radio Networks (PLMN). The MSC performs functions such as call switching, routing, and charging.

All mobile communication networks provide the "basic call services" required for making and receiving calls in home and in foreign (hereinafter referred to as "visited") mobile communication networks. Part of a mobile communication network is Home Location Register, which is a database that holds the subscription and other information (e.g. the type of service) about each subscriber authorized to use the wireless network. Another part of the network is the Visitor Location Register (VLR), which is the database part of a wireless network, which may be a Global System For Mobile Communications (GSM) or Wideband Code Division Multiple Access (WCDMA) network, that holds the subscription and other information about visiting subscribers, that are authorized to use the wireless network. The VLR is often operatively connected to an MSC. Basic service includes, amongst others, calls to/from individual mobile subscribers.

Intelligent networks (IN) were developed to provide additional, more flexible services to supplement existing telephony services in the fixed telephony network. More recently, such IN-based services have also become necessary and/or desirable in mobile telecommunications networks. The term "standard supplementary services" is defined to include those supplementary mobile services, which generally require an individual subscription and which are generally supported by most mobile communication networks. Standard supplementary services include for example call waiting, call forwarding, and call barring. Standard supplementary subscriber services may be divided into two types: firstly those, which modify or supplement the process of "originating" a call, and secondly those, which modify or supplement the process of "terminating" a call. Examples of originating supplementary services include barring of outgoing calls and closed user group. Examples of terminating supplementary services include barring incoming calls, call forwarding, and call waiting.

The deployment of IN services in a mobile network is often accomplished by means of subscriber specific "IN trigger elements". The IN trigger elements are sent to:
MSC/VLR,
Gateway Mobile Switching Center (GMSC), being a switching system that is used in a mobile communications network that also connects to other networks such as PSTN; or
Serving General Packet Radio Service Support Node (SGSN), as part of user registration procedure (for MSC and SGSN) or as part of terminating call handling, for Gateway Mobile Switching Center (GMSC). The SGSN being a switching node in a wireless network that coordinates the operation of packet radios that are operating within its service coverage range. The SGSN operates in a similar process of a MSC and a VLR, except the SGSN performs packet switching instead of circuit switching. The SGSN registers and maintains a list of active packet data radios in its network and coordinates the packet transfer between the mobile radios.

There are some institutions involved in standardising IN trigger elements. One of them is European Telecommunications Standards Institute (ETSI), which is an organization that assists with the standards-making process in Europe. Another institution is the 3rd Generation Partnership Project (3GPP), which oversees the creation of industry standards for the 3rd generation of mobile wireless communication systems. The usage of standardised IN trigger elements is specified in the Customized Applications For Mobile Enhanced Logic (CAMEL) standard, which forms part of the GSM Network (ETSI) and the 3rd Generation Partnership Project (3GPP) specifications. CAMEL specifies strict rules regarding the conditions under which the various IN trigger elements may be sent to the network nodes. CAMEL is an intelligent network service specification that allows service providers to create custom service applications for mobile telephone systems. CAMEL operates on a "services creation node" in a Global System For Mobile Communications (GSM) or 3rd generation mobile communication system network. Examples of CAMEL applications include time of day call forwarding, multiple telephone extension service, and automatic call initiation on special conditions (trigger).

U.S. Pat. No. 6,122,510, by Telefonaktiebolaget LM Ericsson titled "Method and apparatus for providing network-specific mobile services", discloses a method wherein:
per MSC or MSC-group, one or more network-specific supplementary service information sets may be defined.
each subscriber record may have a flag; this flag indicates that the HLR shall send the corresponding network-specific supplementary service data to the MSC where the subscriber is registering.

The problem with the described prior art solution is that an operator has only one group of CAMEL subscribers. Each CAMEL subscriber has the same IN profile. This in turn leads to a lack of flexibility for an operator.

SUMMARY OF THE INVENTION

In order to overcome the problem of existing solutions, it is an object of the present invention to enhance flexibility for an operator providing services to a mobile subscriber or to a group of mobile subscribers.

The object is achieved by providing a method in a mobile telecommunications network comprising multiple service nodes, operated by operators for providing mobile telephony services to a subscriber using a mobile terminal operating within said network, the method comprising the steps of:
defining multiple ranges of service nodes;
defining at least one subscriber profile comprising a combination of at least one of said mobile telephony services;
storing in a database information, which correlates each range of said defined multiple ranges to each profile of said defined at least one subscriber profile.

In the following examples of profiles are provided.

A pre-paid subscriber profile may look like:
for MSCs in Home PLMN (HPLMN), subscriber shall get Originating IN Category Key (OICK) and Mobile Originating SMS CAMEL Subscription Information (MO-SMS-CSI);
for MSCs in a first network abroad, subscriber shall get Originating CAMEL Subscription Information (O-CSI), CAMEL trigger criteria, Dialed Services CAMEL Subscription Information (D-CSI) and MO-SMS-CSI; and
for MSCs in second network abroad, subscriber shall get O-CSI.

A VPN subscriber profile may look like:
for MSCs in HPLMN, shall get OICK;
for MSCs in a first network abroad, subscriber shall get O-CSI, CAMEL trigger criteria; and
for MSCs in a second network abroad, subscriber shall not get CAMEL data The present invention has the following advantages:
it provides for flexible IN trigger element distribution through the GSM network;
global operators may define a global IN strategy with this mechanism, whereby the IN services available to their customers, can be adapted to the network where their subscribers roam;
there is no need for the network to support Extended CAMEL in HLR and MSC. The present invention offers more flexibility to define IN profiles for different roaming networks;
the present invention enables the operator to define e.g. OICK for MSCs in HPLMN and O-CSI for MSCs in VPLMN. There is no need for Extended OICK (E-OICK) and other Extended CAMEL trigger elements;
when an operator introduces a CAMEL service for international roaming, then the subscribers of that operator may roam in VPLMNs with different levels of CAMEL capability, without the need for additional fallback mechanism for these subscribers;
when an operator introduces a CAMEL service for international roaming, then the operator may keep on using its proprietary IN Service for subscribers in the Home PLMN (HPLMN);
the CAMEL operator may differentiate in offering IN capability for various activities, such as circuit switched calls, Short Message Service, General Packet Radio Service (GPRS), Mobility Management etc. (see table 1 hereinbelow), which is useful considering that not all of these services are intended for usage in/all networks where a subscriber may be roaming;
CAMEL Service invocation may be used to offer a subscriber a combination of services, depending on the network. Examples are VPN combined with pre-paid, Pre-paid combined with Number translation or Pre-paid combined with Least Cost Routing.
the operator may offer a subscriber a mix of services, depending on the network where the subscriber registers, without adapting the contents of the IN trigger element (O-CSI etc.) to the country where the subscriber registers;
there is no need for an operator—for the purpose of Basic Optimal Routing—to have settings changed in the HLR that indicate which IN trigger elements may be sent to GMSCs other than its own. This is for example useful for terminating call in handling from a GMSC in the HPLMN, where the operator may use an enhanced pre-paid service, whereas for terminating call from a GMSC in a PLMN that is not the HPLMN, the operator may use a pre-paid service with reduced functionality;
operators having a heterogeneous network, whereby the network consists of a mix of a 2G network and a 3G network, may easily offer different kinds of services in the 3G network than in the 2G network;
the operator may offer different IN service profile for subscribers roaming in a VPLMN in the same country, than for subscribers roaming in a VPLMN in another country in the case that national roaming is deployed in a country;
operators are able to force subscribers to use a specific roaming partner when roaming abroad.

The solution proposed in the present invention may be considered an enhancement of the currently known feature "CAMEL Subscriber Profile"; this enhancement is hereafter referred to as "IN Subscriber Profile".

The invention makes the following scenarios possible:
Scenario 1: Subscriber A roams in MSC1; this subscriber gets a set of Service data, (e.g. CAMEL Service 1, CAMEL Service 3 and CAMEL Service 5).
Scenario 2: Subscriber A roams in MSC2; this subscriber gets a set of Service data, (e.g. CAMEL Service 1 and CAMEL Service 3).
Scenario 3: Subscriber B roams in MSC1; this subscriber gets a set of Service data (e.g. CAMEL Service 2, CAMEL Service 4 and CAMEL Service 6).
Scenario 4: Subscriber C roams in MSC1; this subscriber gets a set of Service data, (e.g. CAMEL Service 2 only).

In other words, the invention allows for defining per subscriber, per MSC (group), what CAMEL shall be sent to that MSC, therefore leading to enhanced flexibility of the operator.

In accordance with another aspect of the present invention, there is provided a telecommunications system arranged for executing a method according to the present invention.

BRIEF DESCRIPTION OF THE DRAWINGS

In the following section, the present invention will be described by way of examples of its embodiments with reference to the attached drawing, in which.

DETAILED DESCRIPTION OF THE INVENTION

The innovative teachings of the present invention will be described with particular reference to the presently preferred exemplary embodiments. However, it should be understood that this class of embodiments provides only a few examples of the many uses of the innovative teachings herein. In general, statements made in the specification of the present invention do not necessarily delimit any of the claimed invention.

Figure 1:
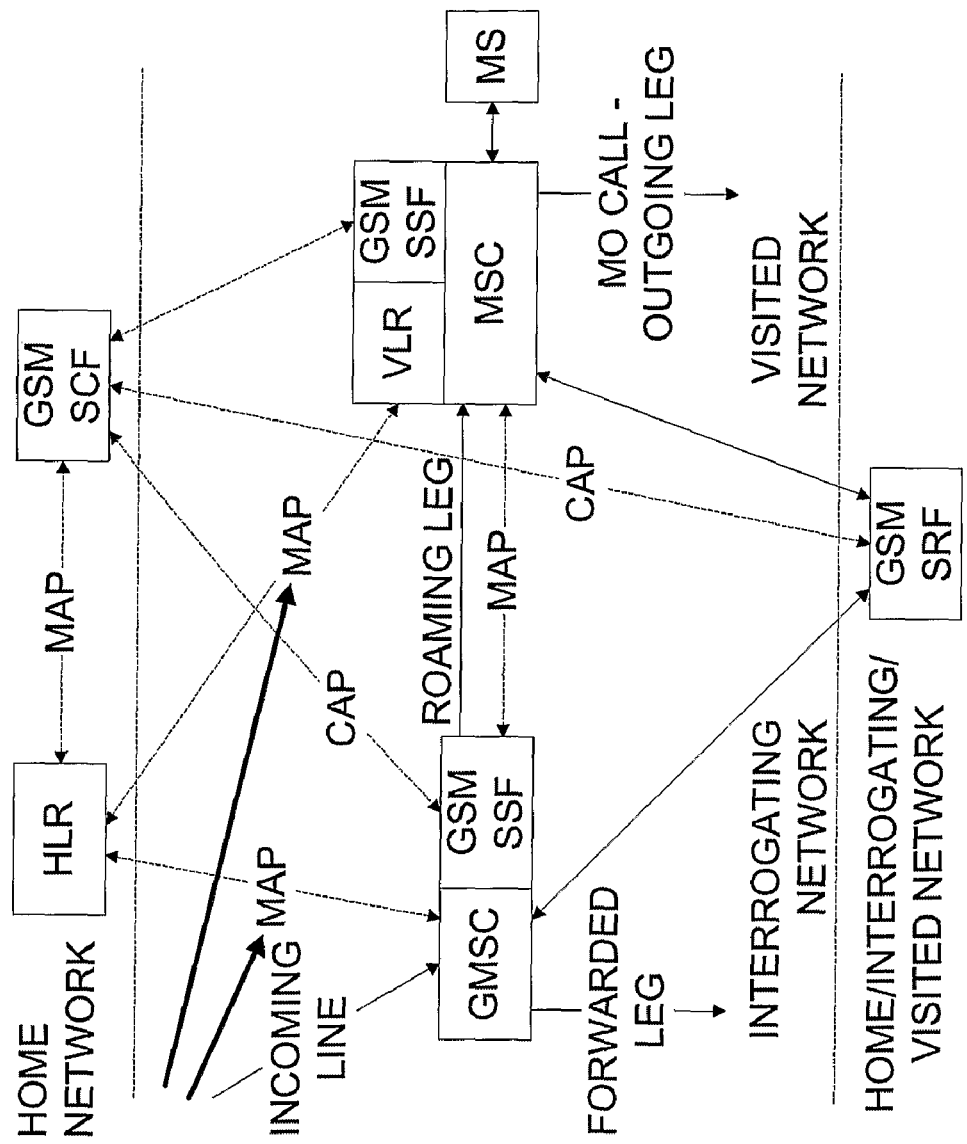
FIG. 1 shows the sending of IN trigger elements to MSC and GMSC.

FIG. 1 shows the sending of IN trigger elements to MSC and GMSC. In order to increase intelligibility of FIG. 1, standardized 3GPP acronyms related to the CAMEL standard are used to indicate the different elements of the figure. These acronyms are known to the person skilled in the art, and include:

| | |
|---|---|
| CAMEL = | Customized Applications For Mobile Enhanced Logic |
| CAP = | CAMEL Application Part |
| GMSC = | Gateway MSC (Mobile Switching Center) |

-continued

| | |
|---|---|
| GSM SCF = | GSM Service Control Function |
| GSM SRF = | GSM Service Resourcel Function |
| GSM SSF = | GSM Service Switching Function |
| HLR = | Home Location Register |
| MAP = | Mobile Application Part |
| MS = | Mobile Switch |
| MSC = | Mobile Switching Center |
| VLR = | Visitor Location Register |

Signal flows between the different elements are indicated in FIG. 1 by arrows.

Figure 2:
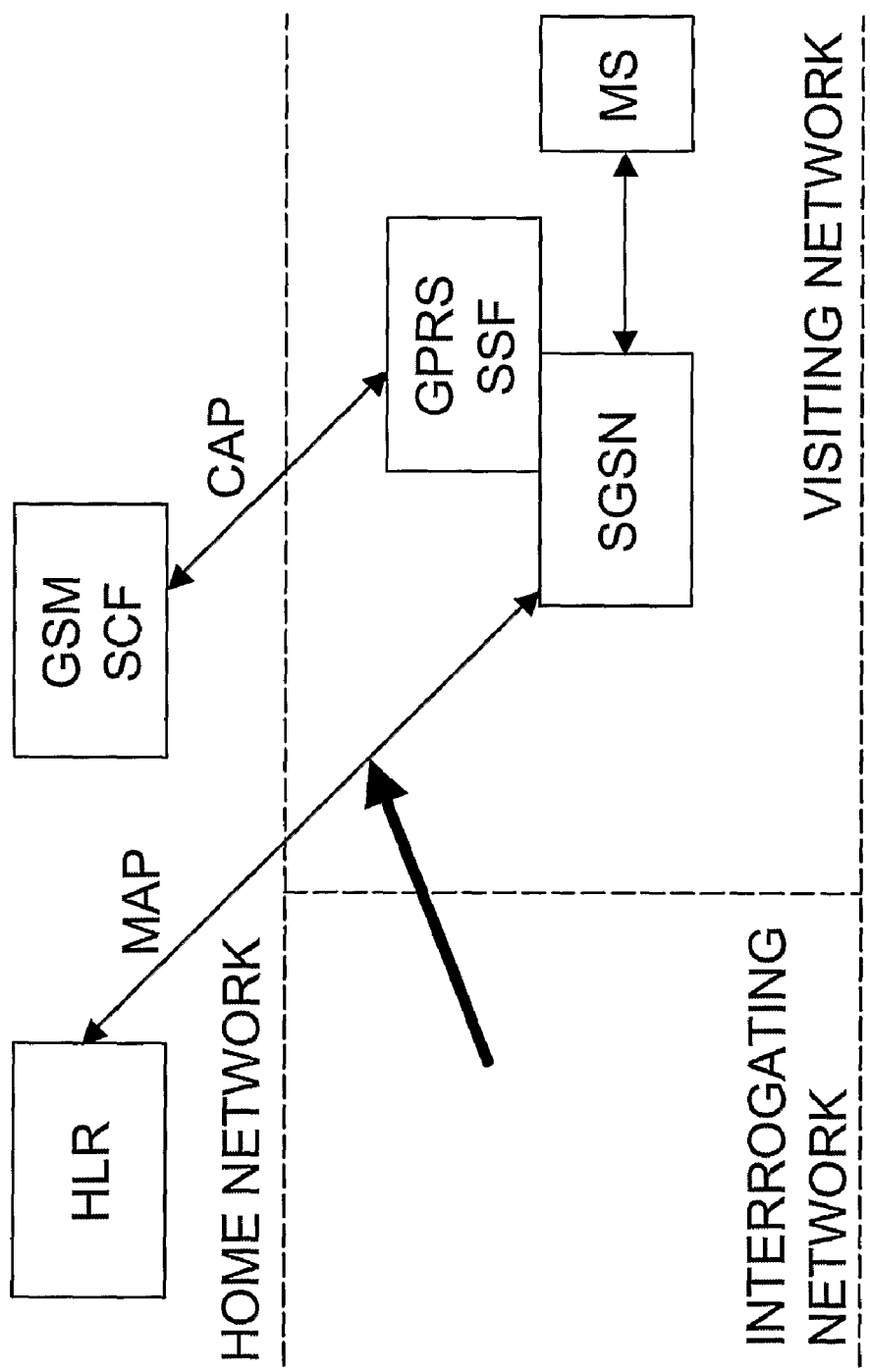
FIG. 2 shows the sending of IN trigger elements to SGSN.

FIG. 2 shows one embodiment of the present invention, which represents the sending of IN trigger elements to SGSN. The arrows indicate the data flows from HLR to core network. The HLR uses MAP (refer 3GPP TS 29.002[4]) for the transfer of the IN trigger elements to the core network.

Table 1 provides an overview of IN trigger elements serving different purposes. As such, they are sent to different entities in the mobile network. The entities in the Mobile Network that may receive IN trigger elements are: MSC, GMSC and SGSN. This is further indicated in Table 2.

TABLE 1

| Ericsson proprietary | |
|---|---|
| Originating call handling | OICK, E-OICK |
| Terminating call handling | TICK, E-TICK |
| Mobility Management | MISI |
| ETSI/3GPP standardised | |
| Originating call handling | O-CSI, D-CSI |
| Terminating call handling | T-CSI, VT-CSI |
| Supplementary Service | SS-CSI, TIF-CSI |
| Mobility Management | M-CSI, MG-CSI |
| Short Message Service | MO-SMS-CSI, MT-SMS-CSI |
| GPRS | GPRS-CSI |

Table 2 provides an overview of available IN trigger elements, grouped per core network entity.

TABLE 2

| Entity | Applicable IN trigger elements | Description |
|---|---|---|
| MSC | OICK, E-OICK, MISI, O-CSI, D-CSI, VT-CSI, SS-CSI, TIF-CSI, M-CSI, MO-SMS-CSI, MT-SMS-CSI | These elements may be used in MSC to apply IN control to Mobile Originated, Mobile Forwarded and Mobile Terminated calls, Mobility Management events, Supplementary services and Short Messages. |
| GMSC | TICK, E-TICK, T-CSI, OICK, E-OICK, O-CSI, D-CSI | These elements may be used in GMSC to apply IN control to Mobile Terminated and Mobile Forwarded calls. |
| SGSN | GPRS-CSI, MO-SMS-CSI, MT-SMS-CSI, MG-CSI | These elements may be used in SGSN to apply IN control to PDP Contexts, Mobility Management events and Short Messages. |

Tables 3a through 3c provide IN Subscriber profile structures per range of entities. The entities in the Mobile Network that may receive IN trigger elements are MSC, GMSC and SGSN. The used terms comprise:

MSC range 1: This is an MSC number; it represents a single MSC or a group of MSCs. If MSC range 1 represents a group of MSCs, then MSC range 1 would contain the leading digits for those MSC Numbers. Example: +31 516 20456 may represent a single MSC; +31 516 20 may represent all MSCs with leading digits +31 516 20.

MSC range 2: Another MSC number or MSC number range.

MSC range n: The nth MSC number or MSC number range.

There may, for example, be 3 MSC ranges in a particular IN Subscriber profile:
one MSC range for the HPLMN;
one MSC range for VPLMN that supports CAMEL Phase 2;
one MSC range for VPLMN that does not support CAMEL Phase 2

Default MSC range: When subscriber roams in an MSC for which no profile is defined, then the default profile applies.

SGSN range 1: This is an SGSN number or SGSN number range. Same applies for SGSN range 2, SGSN range n and default SGSN range.

GMSC range 1: This is a GMSC number or GMSC number range. Same applies for GMSC range 2, GMSC range n and default GMSC range.

GMSC range 1—home: The settings defined for GMSC range 1—home apply when the subscriber receives a call in that GMSC, whilst the subscriber is registered in an MSC in the HPLMN.

GMSC range 1—roaming: The settings defined for GMSC range 1—roaming apply when the subscriber receives a call in that GMSC, whilst the subscriber is registered in an MSC not in the HPLMN.

O-CSI, T-CSI etc.: The presence of a particular CAMEL trigger element in the profile definition for a particular MSC range, SGSN range or GMSC range, means that that CAMEL trigger element applies for that network node (range).

<index>: The <index> value indicates which O-CSI (or T-CSI, D-CSI etc.) definition applies for this MSC Range, SGSN Range or GMSC Range. For each CAMEL trigger element type, an array of definitions is configured. The <index> value selects one CAMEL trigger element definition from the corresponding array.

<value>: For OICK and TICK, a value definition is used. E.g. OICK="567". This corresponds with the OICK definition in existing products.

Fallback settings: The fallback settings define the HLR behaviour in the case that the MSC where the subscriber registers does not support the required CAMEL Phase, as defined by the profile for that MSC. There may be a fallback setting per CAMEL trigger element.

<settings>: The settings may e.g. be:
O-CSI Fallback "disallow registration"
D-CSI Fallback "allow registration without sending D-CSI"

TABLE 3a

IN Subscriber profile #1
MSC-specific IN trigger elements

| MSC Range | MSC IN Profile | |
|---|---|---|
| | Element | Value |
| MSC range 1 | O-CSI | < index > |
| | D-CSI | < index > |
| | MO-SMS-CSI | < index > |
| | MT-SMS-CSI | < index > |
| | Fallback settings | < settings > |
| MSC range 2 | OICK | < value > |
| | VT-CSI | < index > |
| | M-CSI | < index > |

TABLE 3a-continued

IN Subscriber profile #1
MSC-specific IN trigger elements

| MSC Range | MSC IN Profile | |
|---|---|---|
| | Element | Value |
| | MT-SMS-CSI | < index > |
| | Fallback settings | < settings > |
| ... | | |
| MSC range n | O-CSI | < index > |
| | VT-CSI | < index > |
| | M-CSI | < index > |
| | MO-SMS-CSI | < index > |
| | MT-SMS-CSI | < index > |
| | Fallback settings | < settings > |
| Default MSC range | O-CSI | < index > |
| | VT-CSI | < index > |
| | Fallback settings | < settings > |

TABLE 3b

SGSN-specific IN trigger elements

| SGSN Range | SGSN IN Profile | |
|---|---|---|
| | Element | Value |
| SGSN range 1 | GPRS-CSI | < index > |
| | MO-SMS-CSI | < index > |
| | MT-SMS-CSI | < index > |
| | Fallback settings | < settings > |
| SGSN range 2 | GPRS-CSI | < index > |
| | MG-CSI | < index > |
| | MO-SMS-CSI | < index > |
| | MT-SMS-CSI | < index > |
| | Fallback settings | < settings > |
| ... | | |
| SGSN range n | GPRS-CSI | < index > |
| | MO-SMS-CSI | < index > |
| | Fallback settings | < settings > |
| Default SGSN range | GPRS-CSI | < index > |
| | Fallback settings | < settings > |

TABLE 3c

GMSC-specific IN trigger elements

| GMSC Range | GMSC IN Profile | |
|---|---|---|
| | Element | Value |
| GMSC range 1 - home | O-CSI | < index > |
| | Fallback settings | < settings > |
| GMSC range 1 - roaming | O-CSI | < index > |
| | T-CSI | < index > |
| | Fallback settings | < settings > |
| ... | | |
| GMSC range n - home | O-CSI | < index > |
| | T-CSI | < index > |
| | D-CSI | < index > |
| | Fallback settings | < settings > |
| GMSC range n - roaming | O-CSI | < index > |
| | T-CSI | < index > |
| | D-CSI | < index > |
| | Fallback settings | < settings > |
| Default GMSC range | OICK | < value > |
| | TICK | < value > |
| | Fallback settings | < settings > |

If the IN Subscriber profile is defined in accordance with CAMEL roaming agreements, then there should never be a need for the HLR to apply the fallback options. The profile should match the available CAMEL capability in each VPLMN. Fallback may occur if an MSC in a VPLMN has (temporarily) de-activated CAMEL. The occurrence of fallback action indicates an erroneous situation. Hence, a warning should be generated when fallback occurs.

The principle described in the present invention may be extended to cover other subscriber settings as well. Examples are:

Packet Data Protocol (PDP) Context Profile; by providing different PDP Context Profiles, depending on the network, the HPLMN operator can restrict the destinations that are available for roaming GPRS subscribers;
ODB settings.

According to the present invention, the HLR defines a set of IN Subscriber Profiles. Each subscriber may have an index to an instance of an IN Subscriber Profile.

Each IN Subscriber Profile consists of a set of three lists, comprising MSC Addresses, SGSN Addresses and GMSC Addresses.

An MSC Address may be the address of a single MSC or may represent a group of MSCs.

Examples of representation of a group of MSCs are:
multiple 2G MSCs in a PLMN;
multiple MSCs within a PLMN;
multiple MSCs in a country, regardless of PLMN they belong to.

SGSN Addresses and GMSC Addresses may be grouped in a similar way.

Per MSC Address entry, SGSN Address entry and/or GMSC Address entry, an "MSC IN Profile", "SGSN IN Profile" and/or "GMSC IN Profile" respectively, is defined.

In the following we describe an example MSC IN Profile according to the present invention.

An MSC IN Profile, associated with an MSC Address entry, shall reflect an exact IN profile that shall be available when a subscriber registers in that MSC (or in one of the MSCs belonging to that MSC group). Only IN trigger elements that are applicable to MSC may be included in the MSC IN Profile definition. Refer to table 2.

An MSC IN profile definition shall include adequate fallback settings, which indicate the HLR's behaviour in the case the MSC's capability do not allow for the sending of the indicated profile. The MSC IN Profile may consist of any valid combination of CAMEL standardised IN trigger elements or Ericsson-specific IN trigger elements.

In the following we describe an example SGSN IN Profile according to the present invention.

An SGSN IN Profile, associated with an SGSN Address entry, shall reflect an exact IN profile that shall be available when a subscriber attaches to that SGSN (or to one of the SGSNs belonging to that SGSN group). Only IN trigger elements that are applicable to SGSN may be included in the SGSN IN Profile definition, as shown in table 2.

In the following we describe an example GMSC IN Profile according to the present invention.

A GMSC IN Profile, associated with a GMSC Address entry, shall reflect an exact IN profile that shall be available when that GMSC (or a GMSC from that GMSC group) interrogates the HLR for terminating call handling. Only IN trigger elements that are applicable to GMSC may be included in the GMSC IN Profile definition, as shown in table 2.

Within a GMSC IN Profile, a further distinction is made regarding the MSC where the subscriber is registered at the moment of receiving a call. When a subscriber receives a call, that subscriber may be in the HPLMN or may be roaming abroad. When the subscriber is in HPLMN, the HLR may want to send different trigger elements to GMSC than when subscriber is roaming abroad.

In the following we describe an example scenario according to the present invention.

Subscriber in HPLMN: HLR sends T-CSI to GMSC, whereby T-CSI contains a Service Key that denotes VPN service. The on-line charging for this call is done with VT-CSI in VMSC.

Subscriber in VPLMN: HLR sends T-CSI to GMSC, whereby T-CSI contains a Service Key that denotes VPN Service and on-line charging.

In the following we describe an example IN Subscriber Profile according to the present invention.

Tables 3a through 3c present an example of an IN subscriber profile. It is divided in the three main groups:
MSC-specific IN trigger elements (table 3a);
SGSN-specific IN trigger elements (table 3b); and
GMSC-specific IN trigger elements (table 3c).

Each main group is a sequence of Address ranges. Per Address range, there is a Profile definition.

Per subscriber group, a dedicated IN Subscriber Profile is required. Within an operator's network, there are very few subscriber groups, in as far as IN differentiation is concerned. Examples:
pre-paid subscribers;
VPN subscribers;
VPN+pre-paid subscribers;
Personal number subscribers.

Within each Profile definition (for MSC, SGSN or GMSC), there are references to individual CAMEL trigger elements and to Ericsson-proprietary trigger elements. The actual contents of each CAMEL trigger element are contained in separate lists. For each CAMEL trigger element type, there is a separate list of trigger type definitions. In this way, a single definition of a particular CAMEL trigger type may be used in multiple MSC IN profiles etc.

Each o-CSI profile definition has the following structure. This definition is in compliance with the ETSI/3GPP defined structure, as shown in Table 4.

TABLE 4

| O-CSI profile #1 | |
|---|---|
| Trigger Detection Point value | < TDP value > |
| gsmSCF Address | < E.164 address > |
| Service Key | < SK value > |
| Default Call Handling | < DCH value > |
| Triggering Conditions | < Trigger definitions > |
| CAMEL Capability Handling | < CCH value > |

It may be expected that the HLR requires only a small number of different O-CSI definitions.

Each T-CSI profile definition has the following structure. This definition is in compliance with the ETSI/3GPP defined structure, as shown in Table 5.

It may be expected that the HLR requires only a small number of different T-CSI definitions.

TABLE 5

| T-CSI profile #1 | |
|---|---|
| Trigger Detection Point value | < TDP value > |
| gsmSCF Address | < E.164 address > |
| Service Key | < SK value > |
| Default Call Handling | < DCH value > |
| Triggering Conditions | < Trigger definitions > |
| CAMEL Capability Handling | < CCH value > |

Likewise, there are lists with definitions for GPRS-CSI, M-CSI etc., as specified in 3GPP.

Each subscriber's subscription data record may suffice with a single index into a specific In Subscriber Profile definition.

Per subscriber, there is only a single index required. The single index represents a comprehensive IN Subscriber Profile.

The present invention further relates to a telecommunications system arranged for performing a method according to the invention.

Although preferred embodiments of the system, method, and apparatus of the present invention have been illustrated in the accompanying Drawings and described in the foregoing Detailed Description, it is recognized by those skilled in the art, that the present invention is not limited to the embodiments disclosed, but is capable of numerous rearrangements, modifications, and substitutions without departing from the spirit of the present invention as set forth and defined by the following claims.

The invention claimed is:

1. A method of providing mobile telephony services in a mobile telecommunications network comprising multiple service nodes, operated by operators for providing mobile telephony services to a subscriber using a mobile terminal operating within said network, the method comprising the steps of:
defining multiple ranges of service nodes, wherein
the service nodes are nodes capable of executing at least one Intelligent Network (IN) service, in response to at least one IN trigger element,
the mobile telephony services are IN services, and
the ranges are differentiated with respect to said IN services to be provided;
defining at least one subscriber profile further comprising
a combination of at least one of said IN services to be provided, and
at least one IN trigger element; and
storing in a database information which correlates each of said defined at least one subscriber profile to at least one of said defined multiple ranges.

2. The method according to claim 1, wherein said subscriber profile is differentiated for at least one service node of the multiple ranges of service nodes.

3. The method according to claim 2, wherein said subscriber is correlated to said subscriber profile by means of an index to said subscriber profile.

4. The method according to claim 1, wherein each subscriber profile comprises at least one service node address.

5. The method according to claim 4, wherein said at least one service node address represents multiple service node addresses.

6. The method according to claim 1, wherein said subscriber profile is differentiated for different networks between which the subscriber is roaming at the time of Mobile Terminating call handling.

7. The method according to claim 1, wherein said operator operates service nodes in a heterogeneous network, comprising a mix of a first network and a second network, offers different services in the first network than in the second network.

8. The method according to claim 7, wherein the first network comprises a second-generation network, and the second network comprises a third generation network.

9. The method according to claim 1, further comprising the step of providing a subscriber profile having a combination of IN services depending on the network where the subscriber roams.

10. The method according to claim 9, wherein the subscriber profile comprises at least one of a subscriber profile for roaming in a Visited Public Land Mobile Network (VPLMN) in the same country; and a subscriber profile for roaming in a VPLMN in another country.

11. The method according to claim 1, wherein an operator operates service nodes in a Home Public Land Mobile radio Networks (HPLMN), and restricts destinations that are available for roaming General Packet Radio Service (GPRS) subscribers, by providing different Packet Data Protocol Context Profiles depending on the network.

12. The method according to claim 1, wherein a subscriber profile is defined per range of service nodes out of said multiple ranges of service nodes.

13. The method according to claim 1, wherein a subscriber profile is defined per group of subscribers.

14. The method according to claim 13, wherein said group of subscribers comprises one out of the group including:
    pre-paid subscribers;
    Virtual Private Network subscribers; and
    personal number subscribers.

15. The method according to claim 1, wherein a subscriber's subscription data record contains a single index to a specific subscriber profile definition.

16. The method according to claim 1, wherein said multiple service nodes comprise service nodes out of a plurality of service nodes including:
    Mobile Switching Center (MSC);
    Serving General Packet Radio Service Support Node Gateway Mobile Switching Center (GMSC).

17. The method according to claim 1, wherein said Intelligent Network services comprise services out of a plurality of services including:
    Virtual Private Network service;
    Pre-paid service;
    Number translation service;
    Least Cost Routing service.

18. The method according to claim 1, wherein said database is located in a Home Location Register.

19. A telecommunication system comprising multiple service nodes, operated by operators for providing mobile telephony services to a subscriber using a mobile terminal operating within said network, the telecommunication system comprising:
    means for defining multiple ranges of service nodes, wherein
        the service nodes are nodes capable of executing at least one Intelligent Network (IN) service, in response to at least one IN trigger element,
        the mobile telephony services are IN services, and
        the ranges are differentiated with respect to said IN services to be provided;
    means for defining at least one subscriber profile further comprising
        a combination of at least one of said mobile telephony services to be provided, and
        at least one IN trigger element; and
    means for storing in a database information which correlates each of said defined at least one subscriber profile to at least one of said defined multiple ranges.

20. The system according to claim 19, wherein said subscriber profile is differentiated for at least one service node of the multiple ranges of service nodes.

21. The system according to claim 20, wherein said subscriber is correlated to said subscriber profile by means of an index to said subscriber profile.

22. The system according to claim 19, wherein each subscriber profile comprises at least one service node address.

23. The system according to claim 22, wherein said at least one service node address represents multiple service node addresses.

24. The system according to claim 19, wherein said subscriber profile is differentiated for different networks between which the subscriber is roaming at the time of Mobile Terminating call handling.

25. The system according to claim 19, wherein said operator operates service nodes in a heterogeneous network, comprising a mix of a first network and a second network, offers different services in the first network than in the second network.

26. The system according to claim 25, wherein the first network comprises a second-generation network, and the second network comprises a third generation network.

27. The system according to claim 1, further comprising means for providing a subscriber profile having a combination of mobile telephony services depending on the network where the subscriber roams.

28. The system according to claim 27, wherein the subscriber profile comprises at least one of a subscriber profile for roaming in a Visited Public Land Mobile Network (VPLMN) in the same country; and a subscriber profile for roaming in a VPLMN in another country.

29. The system according to claim 19, wherein an operator operates service nodes in a Home Public Land Mobile radio Networks (HPLMN), and restricts destinations that are available for roaming General Packet Radio Service (GPRS) subscribers, by providing different Packet Data Protocol Context Profiles depending on the network.

30. The system according to claim 19, wherein a subscriber profile is defined per range of service nodes out of said multiple ranges of service nodes.

31. The system according to claim 19, wherein a subscriber profile is defined per group of subscribers.

32. The system according to claim 31, wherein said group of subscribers comprises one out of the group including:
    pre-paid subscribers;
    Virtual Private Network subscribers; and
    personal number subscribers.

33. The system according to claim 19, wherein a subscriber's subscription data record contains a single index to a specific subscriber profile definition.

34. The system according to claim 19 wherein said multiple service nodes comprise service nodes out of a plurality of service nodes including:
    Mobile Switching Center (MSC);
    Serving General Packet Radio Service Support Node Gateway Mobile SWitching Center (GMSC).

35. The system according to claim 19, wherein said Intelligent Network services comprise services out of a plurality of services including:
    Virtual Private Network service;
    Pre-paid service;
    Number translation service;
    Least Cost Routing service.

36. The system according to claim 19, wherein said database is located in a Home Location Register.

* * * * *

UNITED STATES PATENT AND TRADEMARK OFFICE
CERTIFICATE OF CORRECTION

Page 1 of 1

PATENT NO. : 7,869,819 B2
APPLICATION NO. : 11/722864
DATED : January 11, 2011
INVENTOR(S) : Noldus It is certified that error appears in the above-identified patent and that said Letters Patent is hereby corrected as shown below:

In Column 3, Line 18, delete "data" and insert -- data. --, therefor.

In Column 3, Line 49, delete "in/all" and insert -- in all --, therefor.

In Column 6, Line 13, delete "2" and insert -- 2. --, therefor.

In Column 6, Line 49, delete "Fallback" and insert -- Fallback= --, therefor.

In Column 6, Line 50, delete "Fallback" and insert -- Fallback= --, therefor.

In Column 9, Line 36, delete "o-CSI" and insert -- O-CSI --, therefor.

In Column 12, Line 55, in Claim 34, delete "SWitching" and insert -- Switching --, therefor.

Signed and Sealed this
Twenty-fourth Day of May, 2011

David J. Kappos
*Director of the United States Patent and Trademark Office*